Figure 1:
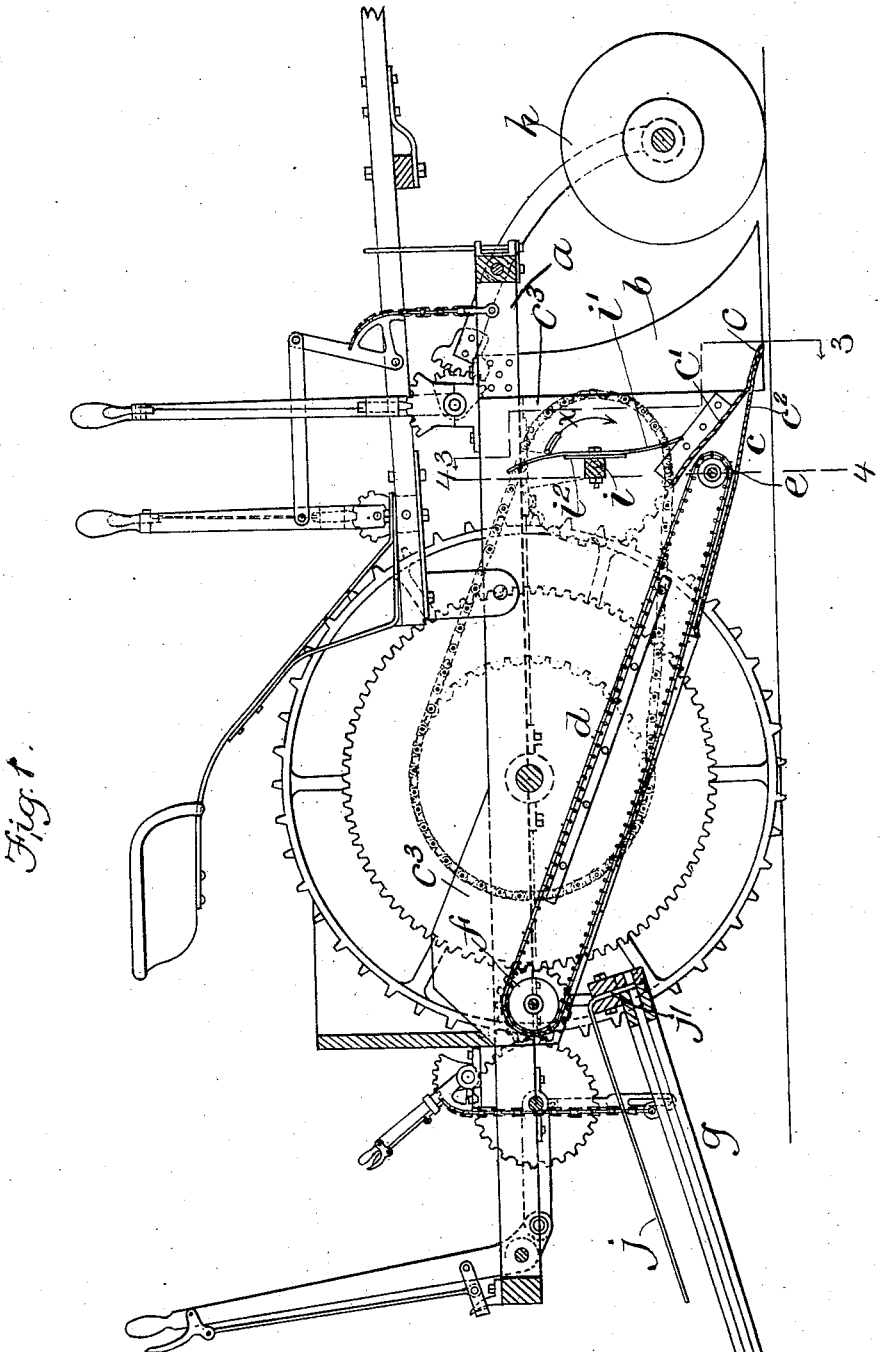

No. 855,457. PATENTED JUNE 4, 1907.
G. N. HOLLAND.
POTATO DIGGER.
APPLICATION FILED SEPT. 15, 1906.

2 SHEETS—SHEET 1.

Witnesses.
Inventor.
Geo. N. Holland
by Wright Brown Quinby & May
Attys.

No. 855,457. PATENTED JUNE 4, 1907.
G. N. HOLLAND.
POTATO DIGGER.
APPLICATION FILED SEPT. 15, 1906.
2 SHEETS—SHEET 2.
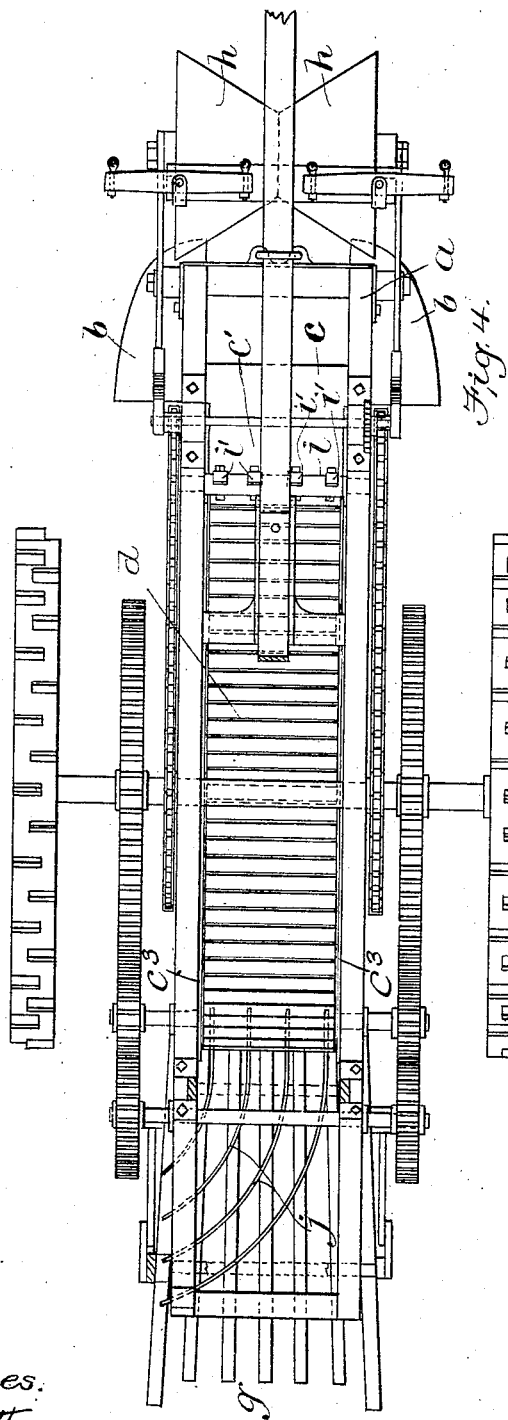
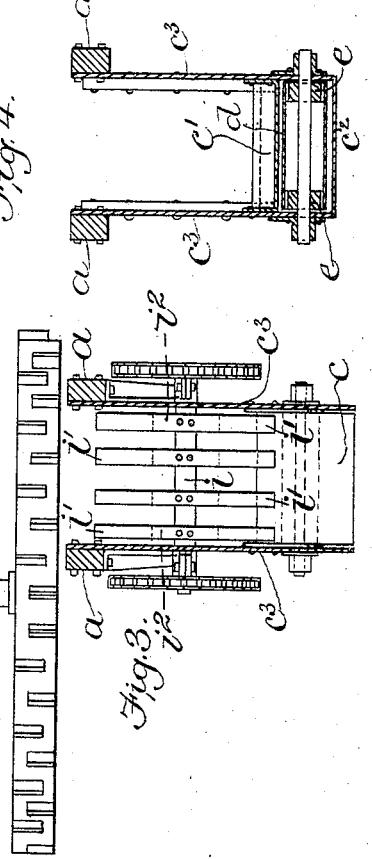
Witnesses.
F. W. Pizzetti
E. Batchelder
Inventor.
Geo. N. Holland
by Wright Brown Quinby & May
Attys.

UNITED STATES PATENT OFFICE.

GEORGE N. HOLLAND, OF HAMPDEN, MAINE, ASSIGNOR OF ONE-HALF TO RICHARD M. NASON, OF BANGOR, MAINE.

POTATO-DIGGER.

No. 855,457. Specification of Letters Patent. Patented June 4, 1907.

Application filed September 15, 1906. Serial No. 334,748.

*To all whom it may concern:*

Be it known that I, GEORGE N. HOLLAND, of Hampden, in the county of Penobscot and State of Maine, have invented certain new and useful Improvements in Potato-Diggers, of which the following is a specification.

This invention relates to that class of potato diggers illustrated in Letters Patent of the United States No. 545,229, granted to me August 27, 1895, the machine illustrated in said patent employing two half-plows to cut away the sides of the hills, an inclined scoop between the plows arranged to take up the central portions of the hills, an endless carrier which receives the earth and potatoes raised upon the scoop and carries the same to a higher point, and a sifter or shaker which receives the matter raised by the carrier and separates the potatoes from the dirt.
The invention consists in certain improvements upon the type of machine illustrated in the said patent, and consists in certain improved means for preventing the clogging of the lower roll of the conveyer by the material raised by the scoop, and for facilitating the movement of the mass of earth, potatoes, etc. from the upper end of the scoop to the lower portion of the carrying stretch of the endless carrier.
Of the accompanying drawings, forming a part of this specification, Figure 1 represents a longitudinal section of a potato digger provided with means embodying my invention. Fig. 2 represents a partial top plan view of the same. Fig. 3 represents a section on line 3—3 of Fig. 1. Fig. 4 represents a section on line 4—4 of Fig. 1.

The same letters of reference indicate the same parts in all the figures.
The general construction of the potato digger in which my improvements are embodied may be substantially the same as that shown in the above-mentioned patent, the machine being provided with two half-plows or moldboards $b\ b$, attached to the forward portion of the supporting frame $a$, and adapted to cut away the side portions of the hills or rows of hills in which the potatoes are contained, an inclined blade or scoop $c$ extending across the space between and behind the plows, and adapted to deflect upwardly the potatoes and dirt left between the plows, an inclined carrier $d$ composed of an endless series of slats or pieces suitably connected and supported by rollers $e\ f$, which are journaled in suitable bearings on the supporting frame, and a shaker or separator $g$ which is arranged to receive the mixture of vines, earth and potatoes which are raised by the carrier $d$ and separate the parts of said mixture, leaving the potatoes lying exposed behind the machine. A grooved roller $h$ is also employed to bear upon the hills in front of the half-plows $b$, said roller being adjustably supported so that it can be raised and lowered to regulate the depth of entrance of the plows into the hills. With the exception of certain improvements hereinafter pointed out in the construction of the scoop $c$, the parts above described do not differ materially in construction and operation from the similar parts described in said Letters Patent.

The scoop $c$ is inclined, and has an inclined extension $c'$ which overhangs the lower roller $e$ and the lower portion of the conveyer, and a wing or guard $c^2$ which projects under the said roller and under the lower portion of the conveyer. The scoop has a cutting edge adapted to cut horizontally through the base portions of the hills after the same have been cut away at their sides by the half-plows $b$. The extension $c'$ of the scoop is inclined more abruptly than the body portion, and raises the vines and other material above the lower roller, preventing said material from coming in contact with and clogging the lower roller $e$. The wing or guard $c^2$ projects under the lower roller, and prevents contact between the same and objects on the ground beneath it. The said wing or guard is arranged to directly support the lower portion of the lower stretch of the conveyer, and prevent the latter from sagging into contact with the ground. The scoop and its extension $c'$ and wing or guard $c^2$ are rigidly attached to vertical side plates or walls $c^3\ c^3$ (Figs. 3 and 4) which extend upwardly from the scoop to the supporting frame $a$, and are suitably secured to the latter. The said side plates are preferably extended rearwardly so that they form guards extending practically the entire length of the carrying stretch of the conveyer, and prevent any material on the conveyer from falling over the edges of the same.

They also prevent the material from falling over the ends of the extension $c'$ of the scoop while passing to the conveyer.

In connection with the scoop and its inclined extension $c'$, I employ a rotary device for transferring the material sliding up the extension $c'$, to the carrying stretch of the conveyer. The said device comprises a shaft $i$ journaled in suitable fixed bearings on the side plates $c^3$, and rotated by suitable means, such as sprocket chains connecting sprocket wheels on the driving axle with sprocket wheels on the shaft $i$. To the shaft $i$ are affixed arms $i'$, which are flexible, and composed of resilient metal strips, bolted or otherwise affixed to the shaft $i$, and preferably reinforced at their central portions by the shorter strips $i^2$. The shaft $i$ and its arms are rotated in the direction indicated by the arrow $x$ in Fig. 1, the arrangement being such that the arms move over the upper portion of the extension $c'$ of the scoop in such proximity thereto as to encounter the material sliding up the scoop, and force said material backwardly from the scoop onto the conveying stretch of the endless conveyer. The yielding construction of the arms $i'$ prevents injury to said arms in case they encounter a stone or other unusual obstruction in the mass of material which passes over the scoop. The arms $i'$ prevent any possibility of the clogging of the material at the upper portion of the scoop, and insure its continuous movement from the scoop to the conveyer. The rotary transferring device is located between the side plates $c^3$ so that the latter guide the material which is being moved by the transferring device, and prevents such material from escaping laterally over the ends of the scoop extension $c'$.

The machine is provided with a series of guides or guiding rods $j$, which are located above the shaker or separator $g$, and are affixed at their upper ends to the head of said separator, their lower portions being curved laterally, so that they guide the vines and weeds which are delivered by the conveyer to one side of the machine. The rods may be affixed to the head of the separator by bending their end portions to form shanks $j'$, which shanks are flattened and clamped between clamping members rigidly affixed to the separator.

I claim:

1. A potato digger comprising a frame having fixed vertical side plates, an endless conveyer located between said plates, and supported by a lower front roll and an elevated rear roll, an inclined scoop having an inclined extension overhanging the lower roll of the conveyer, and a guard projecting under said lower roll and arranged to support and prevent sagging of the lower portion of the lower stretch of the conveyer, the said scoop and its extension and guard being rigidly attached to the side plates, the latter preventing the escape of material over the edges of the conveyer and over the ends of the scoop-extension.

2. A potato digger comprising a frame having fixed vertical side plates, an endless conveyer located between said plates, and supported by a lower front roll and an elevated rear roll, an inclined scoop having an extension overhanging the lower roll of the conveyer, the said scoop and extension being rigidly attached to the side plates, and a rotary transferring device comprising a shaft journaled in the side plates above the extension, and resilient arms attached to the shaft, and adapted to force the materials raised by the scoop over the extension, the said transferring device and scoop-extension being located between the side plates, so that the latter guide the material moved by the transferring device over the scoop-extension, and prevent said material from escaping laterally.

In testimony whereof I have affixed my signature, in presence of two witnesses.

GEORGE N. HOLLAND.

Witnesses:
HORACE ATWOOD,
GEO. W. E. BARROWS.